United States Patent [19]

Macfarlane

[11] Patent Number: 5,739,929
[45] Date of Patent: Apr. 14, 1998

[54] METHOD AND DEVICE FOR HOLOGRAPHIC STORAGE

[75] Inventor: Roger Morton Macfarlane, Menlo Park, Calif.

[73] Assignee: International Business Machines Corporation, Armonk, N.Y.

[21] Appl. No.: 665,258

[22] Filed: Jun. 17, 1996

[51] Int. Cl.$^6$ ............................. G03H 1/02; G03H 1/04; G11C 11/22
[52] U.S. Cl. ..................... 359/3; 359/7; 430/1; 430/2; 365/117; 365/125
[58] Field of Search ............................. 359/3, 7, 6, 10, 359/11; 430/1, 2; 365/117, 124, 125

[56] References Cited

U.S. PATENT DOCUMENTS

| | | | |
|---|---|---|---|
| 3,773,400 | 11/1973 | Amodei et al. | 350/3.5 |
| 3,799,642 | 3/1974 | Phillips et al. | 350/3.5 |
| 3,915,549 | 10/1975 | Amodei et al. | 350/3.5 |
| 3,922,061 | 11/1975 | Glass et al. | 350/3 |
| 3,933,504 | 1/1976 | Phillips et al. | 96/88 |
| 4,052,119 | 10/1977 | Williams et al. | 350/3.5 |
| 4,101,976 | 7/1978 | Castro et al. | 365/119 |
| 4,187,109 | 2/1980 | Megumi et al. | 430/2 |
| 4,339,513 | 7/1982 | Alvarez et al. | 430/1 |
| 4,592,618 | 6/1986 | Huignard et al. | 350/3.61 |
| 4,728,165 | 3/1988 | Powell et al. | 359/7 |
| 4,811,289 | 3/1989 | Sadjian | 365/119 |
| 5,361,148 | 11/1994 | Bjorklund et al. | 359/4 |
| 5,440,669 | 8/1995 | Rakuljic et al. | 359/7 |
| 5,665,493 | 9/1997 | Bai et al. | 359/3 |

OTHER PUBLICATIONS

D. Kirillov et al., "Flexible Complementary Gratings in Photorefractive BaTiO$_3$" Optics Letters, vol. 16, No. 19, Oct. 1, 1991.

Y. Qiao et al., "Electrical Fixing of Photorefractive Holograms in Sr$_{0.75}$Ba$_{0.25}$Nb$_2$O$_6$", Optics Letters, vol. 18, No. 12, Jun. 15, 1993.

R. M. Macfarlane et al., "Blue, Green and Yellow Upconversion Lasing in Er:YLif$_4$ Using 1.5um Pumping", Rand, S. C. (Private Communication), Electr. Lett. 28, 2136 (1992).

L. Hesselink et al., "Optical Memories Implemented with Photorefractive Media", Optical and Quantum Electronics 25 (1993) S611–S661.

F. Micheron et al., "Field and Time Thresholds for the Electrical Fixation of Holograms Recorded in (Sr$_{0.75}$Ba$_{0.25}$)Nb$_2$P$_6$ Crystals", Appl. Phys. Lett., vol. 23, No. 2, 15 Jul. 1973.

J. J. Amodei et al., "Holographic Pattern Fixing in Electro–Optic Crystals", Applied Physics Letters, vol. 18, No. 12, 15 Jun. 1971.

D. von der Linde et al., "Multiphoton Photorefractive Processes for Optical Storage in LiNbO$_3$", Applied Physics Letters, vol. 25, No. 3, 1 Aug. 1974.

D. von der Linde et al., "Optical Storage Using Refractive Index Changes Induced by Two–Step Excitation", J. Appl. Phys., vol. 47, No. 1, Jan. 1976.

D. von der Linde et al., "High–Sensitivity Optical Recording in KTN by Two–Photon Absorption", Applied Physics Letters, vol. 26, No. 1, 1 Jan. 1975.

D. von der Linde et al., "Photorefractive Effects for Reversible Holographic Storage of Information", Appl. Phys., 8, 85–100 (1975).

D. von der Linde et al., "Multiphoton Processes for Optical Storage in Pyroelectrics", Ferroelectrics, 1976, vol. 10, pp. 5–8.

V. E. Wood et al., "Two–Photon Photorefractivity in Pure and Doped LiNbO$_3$", Ferroelectrics, 1981, vol. 27, pp. 237–240.

V. E. Wood et al., "Optical Erasure of One–and Two–Photon Holograms in Fe–Doped LiNbO$_3$", Ferroelectrics, 1981, vol. 34, pp. 175–178.

H. Vormann et al., "Two–Step Excitation in LiTaO$_3$: Fe for Optical Data Storage", Solid State Communications, vol. 49, No. 9, pp. 843–847, 1984.

Y. Ming et al., Photorefractive Effects in LiNbO$_3$:Cr Induced by Two–Step Excitation, Phys. Stat. Sol. (a) 92, 221 (1985).

K. Buse et al., "Activation of BaTiO$_3$ for Infrared Holographic Recording", Optics Communication 85 (1991) 183–186).

K. Buse et al., "Two–Step Photorefractive Hologram Recording in LiNbO$_3$:Fe", Ferroelectrics, 1993, vol. 141, pp. 197–205.

K. Buse et al., "Infrared Holographic Recording in LiNbO$_3$:Cu", Appl. Phys. A 58, 191–195 (1994).

G. C. Bjorklund et al., "Hologram Recording with a HeNe Laser", IBM Technical Disclosure Bulletin, vol. 24, No. 10, Mar. 1992.

L. Hesselink, Digital Holographic Data Storage: Materials and Devices: 1, 1995, OSA Annual Meeting/ILS–XI Program, Monday, Sep. 11.

*Primary Examiner*—Paul M. Dzierzynski
*Assistant Examiner*—Audrey Chang
*Attorney, Agent, or Firm*—Robert B. Martin

[57] ABSTRACT

A two-photon process for writing to a holographic recording medium comprising a photorefractive material doped with an excitation dopant selected from rare earth ions and an ionization dopant selected from transition metal ions or rare earth ions.

13 Claims, No Drawings

METHOD AND DEVICE FOR HOLOGRAPHIC STORAGE

This invention was made with government support under agreement number MDA972-94-2-0008 (ARPA Order No. A576) awarded by the Advanced Research Projects Agency. The government has certain rights in this invention.

FIELD OF THE INVENTION

The present invention relates to an improved method and device for holographic storage and in particular to a method for two photon holographic storage in doped photorefractive material.

BACKGROUND OF THE INVENTION

In holographic recording, a light beam from a coherent monochromatic source (usually a laser) is split into two parts. One part of the beam is scattered off the object to be recorded (object beam). The other unmodulated portion of the beam strikes a recording medium directly (reference beam). The object beam and reference beam intersect in the recording medium to form a complex interference pattern which is recorded in the medium. In the reconstruction step, the reference beam alone strikes the recording medium and is diffracted to produce an image of the object. The photorefractive effect involves light-induced charge redistribution in an optical material to produce internal electric fields which by virtue of the electrooptic effect, produce changes in the index of refraction such that dynamic, erasable holograms are formed which diffract light. The photorefractive effect is achieved by exposing the material to an optical intensity pattern consisting of bright and dark regions, such as formed by interfering two coherent laser writing beams.

Upon illumination, electrons are excited into the conduction band or holes are created in the valence band. These mobile electrons (or holes) move from the illuminated areas to the dark areas and are captured in stationary traps to form internal space charge electric fields i.e., a charge grating. When the interference radiation is shut off, the electrons (or holes) remain trapped at the spatial locations occupied during illumination. Since the photorefractive material has a electro-optic effect, the electric field from the charge grating produces a grating in the optical index of refraction which causes the light diffraction during readout.

Unfortunately, during readout, the incident reading radiation will also excite some electrons into the conduction band of the photorefractive material (or create holes in the valence band) where they are uniformly distributed thereby eventually erasing the interference pattern.

In order to overcome this problem, Von der Linde et al. disclosed a two-photon recording procedure. Multiphoton Photorefractive Process for Optical Storage in $LiNBO_3$, Appl. Phys. Lett. 25, 155 (1974). The procedure requires two photons to form charge carriers in undoped photorefractive material. This was accomplished by choosing recording radiation at two wavelengths such that photons at each wavelength have insufficient energy to form charge carriers.

The two-photon process provides a more stable hologram during reading than the "single-photon" process. Unfortunately, for direct photon band to band excitation of undoped photorefractive material, the light sources required to promote electrons to the conduction band have to be of extremely high power (at least on the order of a gigawatt/$cm^2$) and therefore of extremely short pulse duration (on the order of 10 picoseconds).

In order to enhance the two-photon transition probability and thereby relax these constraints, subsequent work employed ferroelectric materials doped with transition metal ions (e.g., iron and copper ions). Such ions provided intermediate electronic states between the ferroelectric's valence and conduction bands some of which have relatively long-life (e.g., up to 100 nanoseconds). However, transition metal ions have not been shown to have appropriate intermediate levels and/or lifetimes for efficient two-photon process for writing holograms.

For example, Glass et al., U.S. Pat. No. 3,922,061 discloses a two-photon recording process in a ferroelectric doped with transition metal ions. Glass teaches that the light source should be a mode-locked or Q-switched laser having "a minimum peak intensity of 1 megawatt/$cm^2$". Glass further suggests that for some two-photon systems, lasers of 10 to 100 gigawats/$cm^2$ may be required. Unfortunately, such power requirements coupled with mode-locking or Q-switching are incompatible with a low cost, reliable storage system.

It is therefore an object of the present invention to provide an improved method and device for holographic storage.

Other objects and advantages will become apparent from the following disclosure.

SUMMARY OF THE INVENTION

The present invention relates to a two-photon method for writing to a holographic recording medium comprising a photorefractive material doped with an excitation dopant and an ionization dopant. In the method of the present invention, forming charge carriers (e.g., exciting electrons into the conduction band or forming holes in the valence band) involves a two step process, the excitation step and the ionization step. In the present invention, each step of this two step process has been assigned to a separate dopant.

In the method of the present invention a first coherent radiation beam at a first wavelength is split into a reference beam and a spatially modulated object beam. The reference beam and the spatially modulated object beam are then intersected in a recording region of a holographic recording medium. Simultaneously, a second radiation beam at a second wavelength is directed to the recording region. The photons from the first and second beams are absorbed by the excitation dopant to sequentially (i) promote electrons from the ground state of the excitation dopant into a first excited state below the conduction band of the host medium and then (ii) promote the electrons from the first excited state to a second excited state of the excitation dopant which is also below the conduction band of the host medium. With the subsequent decay of the electrons from the second excited state down to a lower level, energy is transferred from the excitation dopant to the ionization dopant to create charge carriers by either (i) ionization of electrons from the ground state of the ionization dopant to the conduction band of the host medium or, (iii) cause excitation of electrons from the valence band of the host medium to the ionization dopant to form holes in the valence band of the medium. The ionized electrons or holes move in response to the optical grating to form a charge grating in the recording medium.

Preferred excitation dopants are rare earth ions and preferred ionization dopants are transition metal ions. The present invention also relates to a holographic storage device for performing the method of the present invention.

A more thorough disclosure of the present invention is presented in the detailed description which follows.

DETAILED DESCRIPTION OF THE INVENTION

The present invention relates to a method for two-photon recording in a holographic recording medium comprising a photorefractive host material doped with an excitation dopant and an ionization dopant. Preferably, the host material is a photorefractive crystal.

The photorefractive material for use in the present invention is preferably a single crystal and preferably a ferroelectric crystal. As used herein, the term "ferroelectric" refers to crystals exhibiting an electric dipole moment even in the absence of an external electric field. Suitable host media are lithium niobate, potassium lithium niobate, lithium tantalate, barium titanate, strontium barium niobate (SBN), lead barium niobate (PBN), barium strontium potassium sodium niobate (BSKNN), potassium tantalate niobate, bismuth silicate and bismuth germanate. Preferred ferroelectric host media are lithium niobate, lithium tantalate, barium titanate and SBN. Other suitable host media will be known to those skilled in the art.

Suitable excitation dopants have at least 2 intermediate excited states below the conduction band of the host with lifetimes e.g., preferably 100 microseconds or longer. Suitable excitation dopants are rare earth ions including praseodymium, samarium, europium, holmium, erbium and thulium. Each of these elements provide ions which have 4f excited states which are below the conduction band of the ferroelectric host; give rise to absorptions in the near infrared to visible spectral regions and typically have lifetimes on the order of 0.1 to 1 milliseconds. Ytterbium can also be utilized as an excitation dopant with its pair energy transfer properties which will give a nonlinear (but not gated) response. Particularly preferred rare earth excitation dopants are erbium, praseodymium, holmium, and thulium which have excited state absorptions in the frequency range of commercial semiconductor lasers.

Suitable ionization dopants are transition metal ions and rare earth ions. Suitable ionization dopants for excitation of electrons into the conduction band of the medium include $Fe^{+2}$, $Ti^{+3}$, $Cr^{+3}$, $Cu^+$, $Co^{+2}$, $Ce^{+3}$, $Tb^{+3}$, $Rh^{+3}$ and $Pr^{+3}$. Suitable ionization dopants for excitation of electrons from the valence band of the medium into the ionization dopant to form holes in the valence band include $Fe^{+3}$, $Ti^{+4}$, $Cr^{+4}$, $Co^{+3}$, $Tb^{+4}$, $Yb^{+3}$, and $Sm^{+3}$.

Other suitable ionization dopants include photoionizable centers (e.g., color centers) incorporated into the ferroelectric host by processing in a reactive atmosphere such as oxygen or metal vapor or with ionizing radiation and such dopants should be contemplated as equivalents of those claimed herein.

The ground state of the excitation dopant is conveniently below the ground state of the ionization dopant and the second excited state of the excitation dopant is conveniently at an energy level equal to or greater than the ionization energy of the ionization dopant.

The excitation and ionization ion dopants are generally doped into the ferroelectric medium as oxide salts by art known processes. The doped ferroelectric crystals of this invention may be prepared according to conventional methods known in the art or be purchased from vendors such as Virgo Optics of Port Richey, Fla. Deltronic Crystal Industries, Inc. of Dover, N.J.; Fujian Castech Crystals, Inc. of Fuzhou, Fujian Peoples Republic of China; CSK Optronics, Culver City, Calif.; and JTT International, Orlando, Fla. Depending upon the nature of the material, crystal growth may be by deposition from the vapor phase (e.g., sputtering, evaporation, ablation, chemical vapor deposition), by bulk process, such as by melt growth, from flux, etc. In general, melt growth involves fusing inorganic components in the correct ratios to form the doped ferroelectric and then pulling a single crystal from the melt. Such techniques are described in, for example, "Development and modification of photorefractive properties in the tungsten bronze family crystals" by Neurgaonkar in Optical Engineering, Vol. 26, pg. 392 et seq., May 1987, which is incorporated herein by reference for all purposes.

The thickness for the resulting holographic recording medium is suitably at least several times $\lambda$, where $\lambda$ is the wavelength of the radiation used to generate the interference pattern. In preferred embodiments, the holographic recording medium will have a thickness of between about 0.1 and 10 millimeters.

The photorefractive holographic recording composition of the present invention preferably comprises (i) about 1 to 10 atomic % of the excitation dopant and (ii) about 0.001 to 0.1 atomic % of the ionization dopant and the remainder ferroelectric material.

In the first step of the preferred method of the present invention, a first radiation source provides a first beam of coherent monochromatic radiation at a first wavelength. Suitable radiation sources include lower power continuous wave lasers such as diode lasers, Ti sapphire, Nd:YAG lasers and repetitively Q switched lasers. The coherent first beam is then split with a beam splitter into a reference beam and an object beam. The object beam is then spatially modulated.

To ensure that a meaningful interference pattern is produced, the object and reference beams have a fixed phase relationship. Thus, these beams are suitably produced by a single coherent laser radiation source. Spatial modulators for modulating the object beam are conventional in the art and include, for example, liquid crystal modulators, electro-optic modulators, Si micromechanical reflection modulators, magneto-optic modulators, and acousto-optic modulators. Such modulators are discussed in "The Physics of Optical Recording" by K. Schwartz, Springer-Verlag, 1993 which is incorporated herein by reference for all purposes.

In the second step of the method of the present invention, the reference beam and object beam are recombined (intersected) in the recording medium to form an interference pattern in a recording region of the recording medium. It is desired that the first beam of radiation not create charge carriers (e.g., ionize electrons (i) from the valence band of the host to the ionization dopant or (ii) from the ionization dopant into the conduction band of the host).

The third step of the method of the present invention involves directing a second beam of radiation (gating beam) from a second radiation source to the recording region. While the object and reference beams are monochromatic and coherent, the gating beam need not be. Thus, the gating beam need not be produced by a laser and need not even be monochromatic. In general, the gating beam source need only produce radiation in a wavelength range which will promote electrons into an excited state of the excitation dopant. However, it is desired that the gating beam not include wavelengths which could create charge carriers by a single photon mechanism. Thus, it is desirable to block some of the shorter wavelength photons from striking the recording medium (by e.g., a notch filter). Further, it is desired that the gating beam be in resonance with the excitation dopant transition, and therefore wavelengths outside of the range necessary for this transition will not be useful. Therefore, it is preferred to use a laser as the gating beam source.

Suitable gating beam sources include, for example, filtered xenon lamps, filtered halogen lamps, argon ion lasers, doubled Nd:YAG lasers, and diode lasers. The gating beam will preferably be at a second wavelength which is different than the wavelength of the first beam of radiation.

The second beam is also simultaneously focused to the recording region of the medium with the object and reference beams. The photons from the first and second beams together sequentially promote the electrons of the excitation dopant up to a first and second excited state below the conduction band of the host ferroelectric medium. When it is in its second excited state, the excitation dopant transfers its accumulated energy (cross relaxation) to the ionization dopant to create charge carriers by (i) ionizing electrons of the ionization dopant into the conduction band of the host ferroelectric medium or (ii) ionizing electrons from electrons from the valence band of the host medium to the ground state of the ionization dopant. Such energy transfers between two dopants are known in the art such as disclosed in Energy Transfer Processes in Condensed Matter, Ed. B. DiBartolo NATO ASI Series, Vol. 114, Plenum Press (1984) which is incorporated herein by reference for all purposes. The charge carriers then move in response to the optical grating to form a charge grating in the recording medium to record the hologram. Holograms can be recorded by angular multiplexing.

The recorded information is then read from the ferroelectric medium with a monochromatic read beam having a wavelength equal to the first beam. The light from the reading beam is diffracted by the ferroelectric medium. The diffracted beam then conveniently passes through a lens to produce a holographic image of the data representation which is captured by a detector array such as a charge-coupled device (CCD). Output from the detector array can be converted into a serial binary form suitable to input into standard computer central processing units. Reading of the medium does not cause erasure of the charge grating.

The present invention also relates to a holographic storage device comprising:

1) the recording medium of the present invention;
2) a laser to form a laser beam;
3) a beam splitter for splitting the laser beam into two beams of coherent electromagnetic radiation of the same polarization (the reference and object beams);
4) a modulator for impressing spatial information on the object beam;
5) one or more mirrors to direct the object and reference beam to intersect in the recording medium; and
6) a second radiation source to direct a second electromagnetic radiation beam to the recording medium.

Preferably, the device is provided with a plurality of mirrors and with means for controlling the reference beam's angle for angular multiplexing such as a deflector element comprising a galvanometer scanner or acousto optic beam deflector. Optionally, for nonferroelectric media, the device is provided with means for providing an external electric field such as by imposing a voltage across electrodes disposed on the medium. The operational parameters for holographic storage and components for holographic storage devices are well known in the art for crystalline photorefractive materials such as disclosed in Collier et al., Optical Holography, Chapter 16, Academic Press (1991) the disclosure of which is incorporated herein by reference for all purposes.

Examples of Suitable Holographic Recording Media Are:

1. SBN medium with Erbium ion excitation dopant and ionization dopant selected from $Ce^{+3}$ or $Rh^{+3}$ utilizing a first radiation source at about 980 nm in resonance with the Er $^4I_{15/2} \rightarrow {}^4I_{13/2}$ transition and a second radiation source at about 850 nm in resonance with the $Er {}^4I_{13/2} \rightarrow {}^4S_{3/2}$ transition.

2. SBN medium with holmium ion excitation dopant and ionization dopant selected from $Ce^{+3}$ or $Rh^{+3}$ utilizing a first radiation source at about 900 nm in resonance with the Ho $^5I_8 \rightarrow {}^5S_5$ transition and a second radiation source at about 750 nm in resonance with the Ho $^5I_7 \rightarrow {}^5S_2$ transition.

3. SBN medium with thulium ion excitation dopant and ionization dopant selected from $Ce^{+3}$ or $Rh^{+3}$ utilizing a first radiation source at about 800 nm in resonance with the Tm $^3H_6 \rightarrow {}^3H_4$ transition and a second radiation source at about 650 nm in resonance with the Tm $^3F_4 \rightarrow {}^1G_4$ transition.

In these examples, lithium niobate or barium titanate can also be utilized as the host medium.

In an alternative embodiment of the present invention, the holographic recording medium comprises an organic polymer, a charge transport agent, a non-linear optical chromophore and an excitation dopant. The organic sensitizer functions as the ionization dopant. The charge transport agent can be dispersed in the polymer or covalently bonded to the polymer. Suitable polymers, charge transport agents, sensitizers and NLO chromophores are disclosed in U.S. Pat. Nos. 5,460,907 and 5,361,148, the disclosures of which are incorporated herein by reference for all purposes. The excitation dopant is suitably chelated with the sensitizer. Alternatively, the excitation dopant such as an erbium ion can be positioned inside the cage of a fullerene (e.g., $C_{60}$) sensitizer.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A method for writing to a holographic recording medium comprising a photorefractive material doped with an excitation dopant selected from rare earth ions and an ionization dopant selected from the group consisting of transition metal ions or rare earth ions, the method comprising the steps of:

(i) separating a first coherent radiation beam at a first wavelength into a reference beam and spatially modulated object beam;
   (ii) intersecting the reference beam and the spatially modulated object beam in a recording region of holographic recording medium; and
   (iii) directing a second radiation beam at a second wavelength different from the first wavelength to the recording region whereby photons of the first and second wavelengths are absorbed by the excitation dopant which transfers energy to the ionization dopant thereby generating charge carriers to record a charge grating in the holographic recording medium.

2. The method of claim 1 wherein the photorefractive material is ferroelectric.

3. The method of claim 2 wherein the ionization dopant is a transition metal ion.

4. The method of claim 3 wherein the photorefractive material is selected from the group consisting of lithium niobate, lithium tantalate, barium titanate and strontium barium niobate.

5. The method of claim 4 wherein the excitation dopant is an ion selected from the group consisting of erbium, praseodymium, holmium and thulium.

6. The method of claim 4 wherein the ionization dopant is an ion selected from the group consisting of iron, copper, cobalt, titanium and chromium.

7. A holographic storage device comprising:
   a) a holographic recording medium comprising a photorefractive material doped with an excitation dopant selected from rare earth ions and an ionization dopant selected from the group consisting of transition metal ions or rare earth ions;
   b) a laser for forming a laser beam;
   c) a beam splitter for splitting the laser beam into two beams of coherent electromagnetic radiation;
   d) a modulator for impressing spatial information on one of the coherent beams of radiation;
   e) a mirror to cause the beams of coherent radiation to intersect in the recording medium; and
   f) an electromagnetic radiation source for directing a second beam of electromagnetic radiation to the recording medium where the second beam has a wavelength different from the wavelength of the laser beam and the laser beam and the second beam function to generate charge carriers to record a charge grating in the recording medium.

8. The device of claim 7 wherein the photorefractive material is ferroelectric.

9. The device of claim 8 wherein the ionization dopant is a transition metal ion.

10. The device of claim 9 wherein the photorefractive material is selected from the group consisting of, lithium niobate, lithium tantalate, barium titanate and strontium barium niobate.

11. The device of claim 10 wherein the excitation dopant is an ion selected from the group consisting of erbium, praseodymium, holmium and thulium.

12. The device of claim 11 wherein the ionization dopant is an ion selected from the group consisting of iron, copper, cobalt, titanium and chromium.

13. A method for writing to a holographic photorefractive recording medium comprising a polymer, a non-linear optical chromophore, a charge transport agent, a sensitizer and an excitation dopant selected from rare earth ions, the method comprising the steps of:
   (i) separating a first coherent radiation beam at a first wavelength into a reference beam and a spatially modulated object beam;
   (ii) intersecting the reference beam and the spatially modulated object beam in a recording region of the holographic recording medium; and
   (iii) directing a second radiation beam at a second wavelength different from the first wavelength to the recording region whereby photons of the first and second wavelengths are absorbed by the excitation dopant which transfers energy to the sensitizer thereby generating charge carriers to record a charge grating in the holographic recording medium.

* * * * *